(12) United States Patent
Petruzzi et al.

(10) Patent No.: US 7,589,963 B2
(45) Date of Patent: Sep. 15, 2009

(54) PYRAMIDAL CASE, FOR COMPUTER, WITH HIGH ABILITY TO DISSIPATE THE HEAT

(75) Inventors: Vasco Petruzzi, Via Salvatore Quasimodo 85, Rome (IT) I-00144; Pierfilippo Vigliano, Rome (IT); Paolo Vigliano, legal representative, Rome (IT); Paola Imperiale, legal representative, Rome (IT)

(73) Assignee: Vasco Petruzzi, Rome (IT)

( * ) Notice: Subject to any disclaimer, the term of this patent is extended or adjusted under 35 U.S.C. 154(b) by 122 days.

(21) Appl. No.: 11/666,111

(22) PCT Filed: Oct. 24, 2005

(86) PCT No.: PCT/IT2005/000616

§ 371 (c)(1),
(2), (4) Date: Apr. 24, 2007

(87) PCT Pub. No.: WO2006/046267

PCT Pub. Date: May 4, 2006

(65) Prior Publication Data

US 2008/0094796 A1    Apr. 24, 2008

(30) Foreign Application Priority Data

Oct. 25, 2004   (IT) ................ RM20040166 U

(51) Int. Cl.
H05K 7/20   (2006.01)
(52) U.S. Cl. .............. 361/679.51; 361/694; 361/695; 361/697
(58) Field of Classification Search .......... 361/687, 361/694–695, 697, 679.49, 679.51
See application file for complete search history.

(56) References Cited

U.S. PATENT DOCUMENTS

| 5,597,034 | A | * | 1/1997 | Barker et al. ............... 165/80.3 |
| 5,940,274 | A |   | 8/1999 | Sato et al. |
| 6,370,023 | B1 | * | 4/2002 | Su .............................. 361/687 |
| 6,791,837 | B2 | * | 9/2004 | Chen et al. .................. 361/695 |

(Continued)

FOREIGN PATENT DOCUMENTS

GB       2 271 446 A    4/1994

OTHER PUBLICATIONS

Elliott Gould: "Online!" Jul. 25, 2004 Internet Article, Retrieved from the internet: URL:http://www.pbase.com/mrelliottgould/image/31797646 (XP002364782).

(Continued)

*Primary Examiner*—Gregory D Thompson
(74) *Attorney, Agent, or Firm*—Frommer Lawrence & Haug LLP; Ronald R. Santucci

(57) ABSTRACT

A pyramidal case for computer, with a square base includes a support on a box, with a rectangular rear section and a trapezoidal front section, which dissipates the heat with greater efficiency and effectiveness, through obliged paths of the air flows which amplify the natural thermodynamics of the warm air masses. The study and the coercion of the air flows, applied to this invention, allow a greater dissipation of the heat with respect to any other existing case, which bases the cooling on directional air flows towards each component, but that inside the case itself, become chaotic and poorly efficient in the management of the whole generated heat.

4 Claims, 5 Drawing Sheets

U.S. PATENT DOCUMENTS

| | | | | |
|---|---|---|---|---|
| 6,875,101 | B1* | 4/2005 | Chien | 454/184 |
| 6,972,950 | B1* | 12/2005 | Wyatt et al. | 361/687 |
| 7,126,819 | B2* | 10/2006 | Liang | 361/695 |
| 2003/0002246 | A1* | 1/2003 | Kerr | 361/683 |
| 2005/0174732 | A1* | 8/2005 | Lin | 361/695 |
| 2006/0002084 | A1* | 1/2006 | Wei | 361/695 |
| 2006/0028797 | A1* | 2/2006 | Chou | 361/695 |

OTHER PUBLICATIONS

Anonymous: "Online!" Feb. 3, 2005 Internet Article, Retrieved from the internet: URL:http://www.silverpcs.com/product/LUXOR_PYRAMID_SILVER> (XP002364783).

Anonymous: "Online!" Feb. 3, 2005 Internet Article, Retrieved from the internet: URL:http://web.archive.org/web/20050203015825/http://www.silverpcs.com (XP002364904).

\* cited by examiner

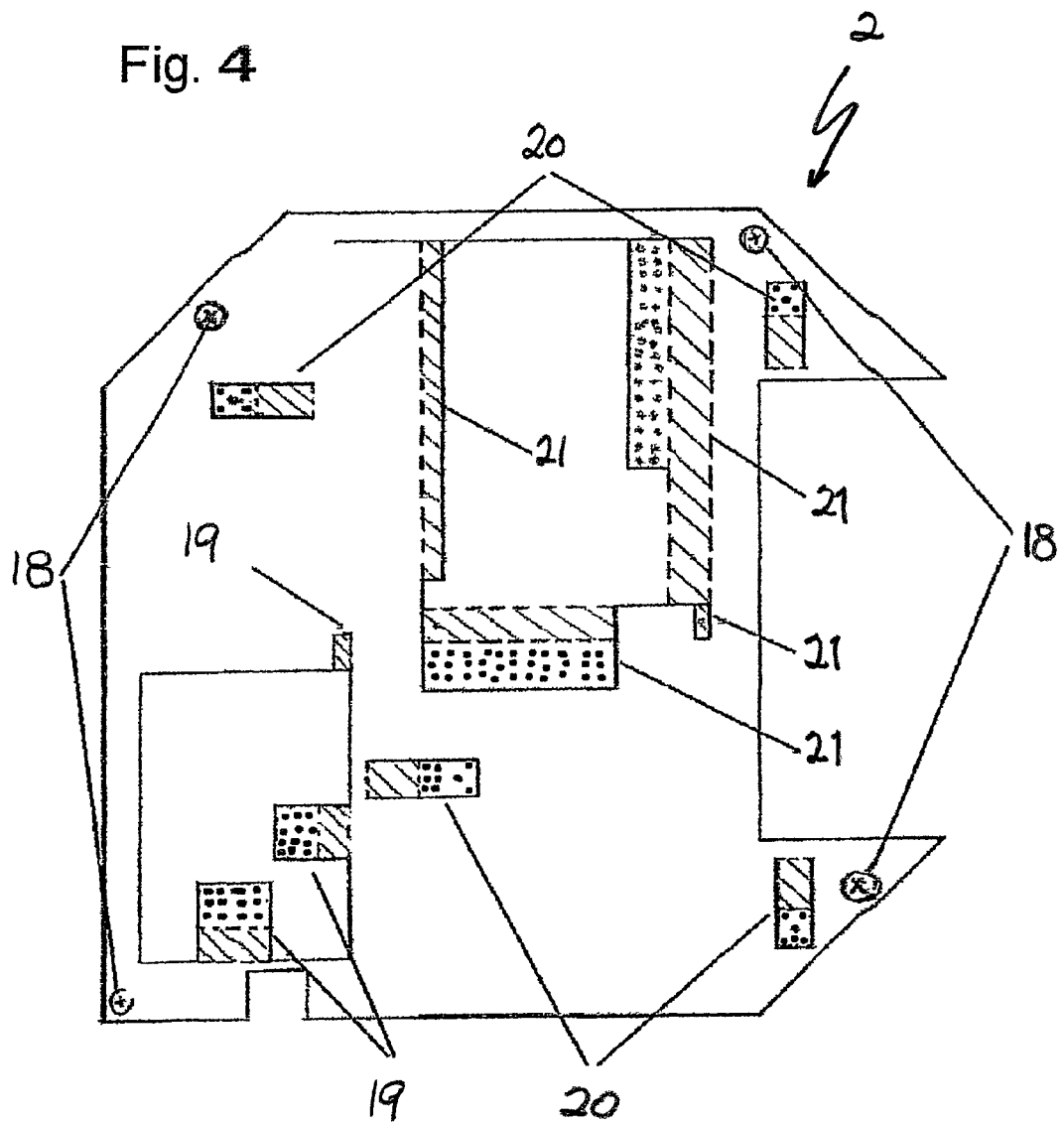

US 7,589,963 B2

PYRAMIDAL CASE, FOR COMPUTER, WITH HIGH ABILITY TO DISSIPATE THE HEAT

This application is a 371 of PCT/IT2005/000616 filed on Oct. 24, 2005, published on May 4, 2006 under publication number WO 2006/046267 A1 and claims priority of Italian Patent Application Number RM2004U000166 filed Oct. 25, 2004, the disclosure of which is incorporated herein by reference.

BACKGROUND

The present invention relates to a pyramidal case, for computer, with high ability to dissipate the heat.

BRIEF DESCRIPTION OF THE DRAWINGS

FIG. 4 is a drawing of a plan view of a chassis of the case of FIGS. 1A-1B;

DETAILED DESCRIPTION

Figure 5A:
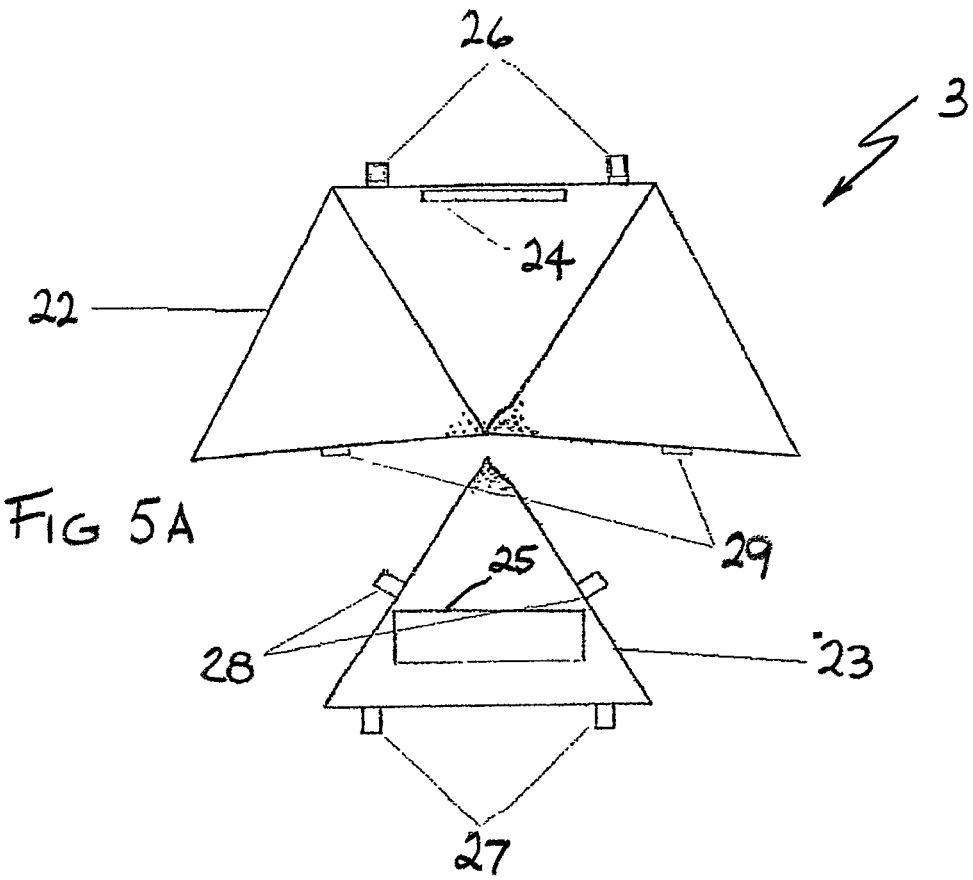
FIG. 5A is a of to the case of FIGS. 1A-1B.
Figure 5B:
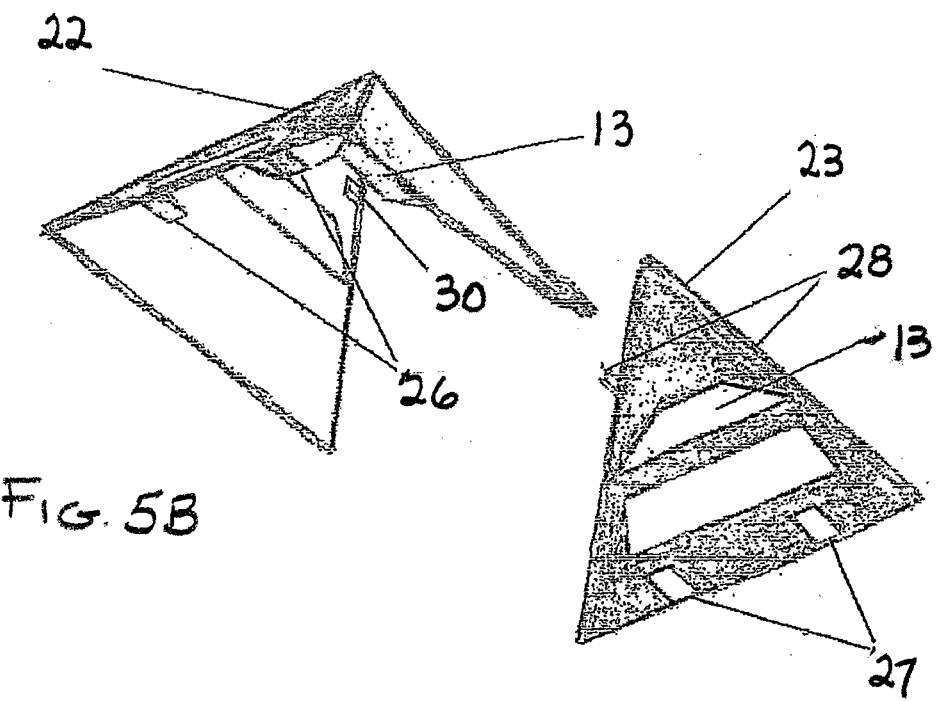
FIG. 5B is a perspective view of the top portion of FIG. 5A.

The Pyramid with a square base is obtained from the joining of three fundamental parts which are: base or container 1 for local power source (FIGS. 1A-1B), chassis or support 2 for the components (FIG. 4) and upper part 3 (FIGS. 5A-5B).

These three parts, join respectively to each other, through implantation screws and fitting flaps; these last ones are designed to render the cover easily interchangeable.

The case of the invention is illustrated in the five attached designs.

Figure 1A:
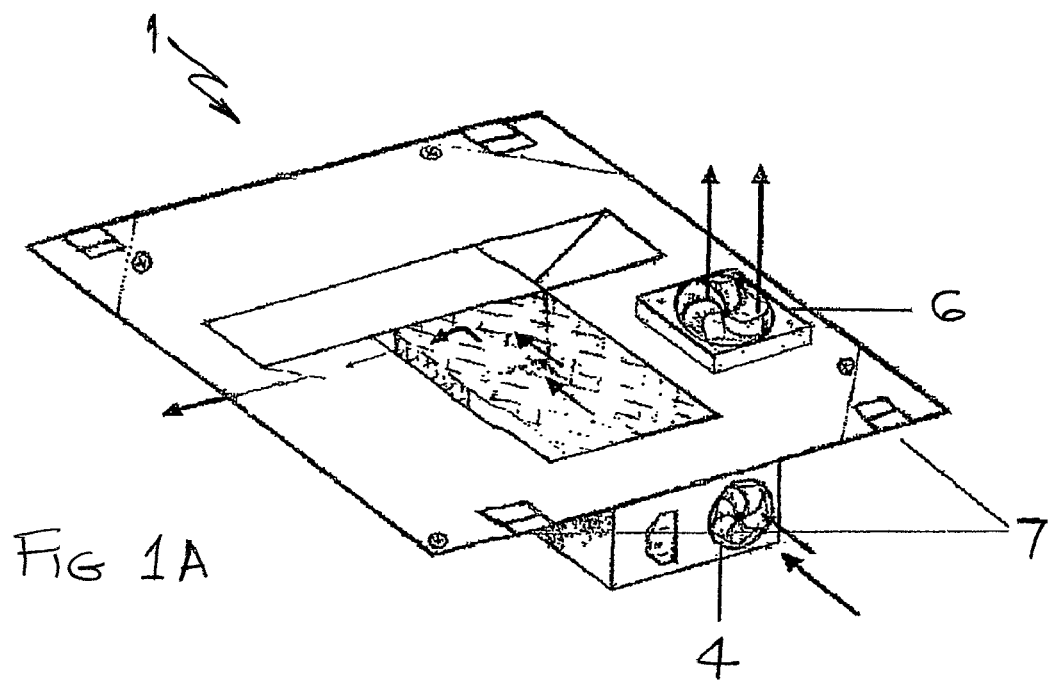
FIGS. 1A-1B are a drawing of a case in accordance with the present disclosure.
Figure 1B:
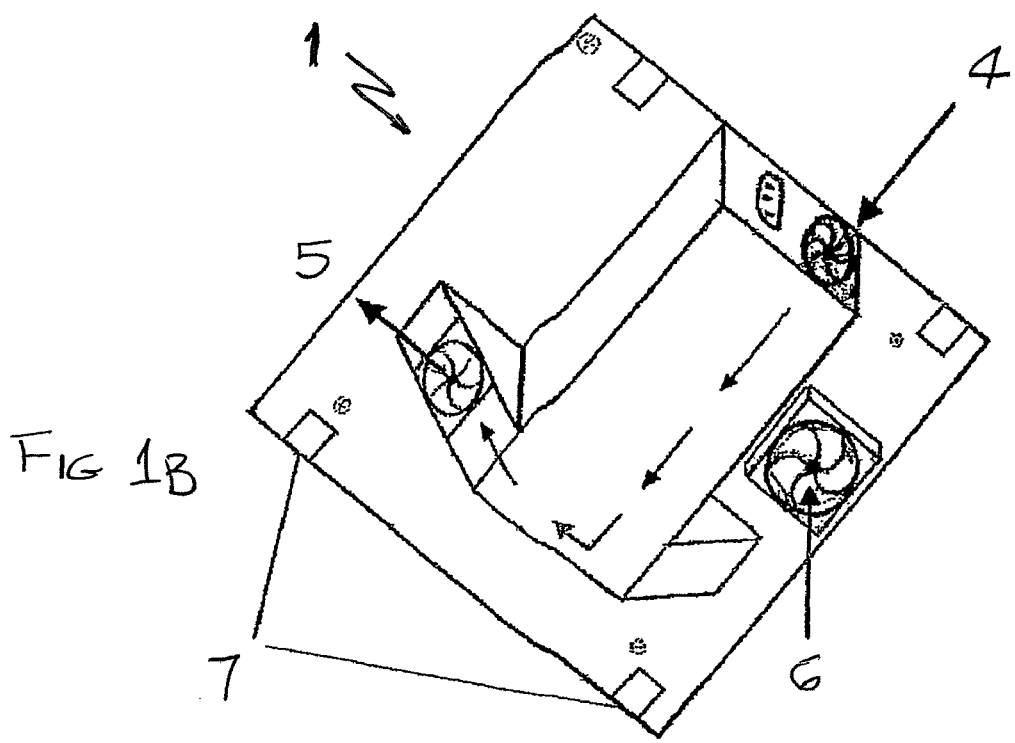

In FIG. 1A and FIG. 1B it is shown air intake impeller 4 of the local power source and the respective incoming air flow are illustrated, the air flow being pushed by the impeller and attracted due to depression by the extraction impeller 5, placed in the lateral part of the trapezoidal section of the container for the local power source and the respective outgoing air flow, It is shown by 6 an air the intake impeller directed to the flow of the case with the respective incoming air flow (from the outside to the inside of the case).

It is shown by 7 recesses of the fitting flaps of the upper part of the case (FIGS. 5A-5B) respectively in the rear part and in the front part of the base of the pyramid as discussed in more detail herein below. The cover of the local power source independently manages (being isolated) the air flows with respect to the upper part of the pyramid, containing the other heat generating components.

Figure 2:
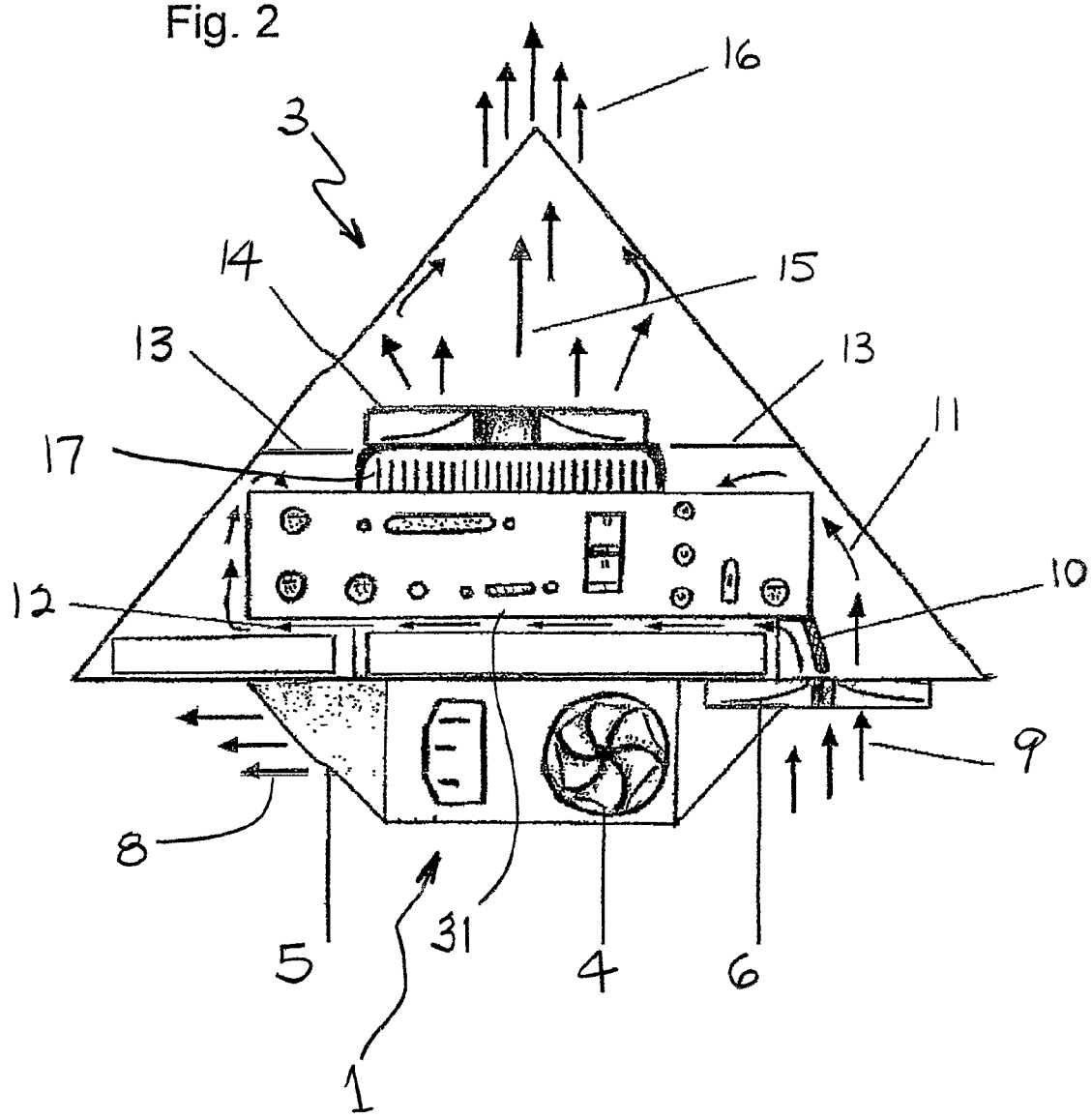
FIG. 2 is a drawing of a vertical section of the case of FIGS. 1A-1B from a rear view.

FIG. 2 shows the vertical section of the case, from a rear view, which illustrates the air flows.

FIG. 2 shows the local power source impeller 4, an outgoing air flow 8 from the local power source section, the incoming air impeller 6 for direction of the incoming air flow 9 towards the inside of the case.

It is shown by 10 an air flow deflector which divides, respectively, the air flow which goes to the motherboard 31 side and an air flow 12 which goes under the motherboard 31, which allow the fresh air mass crossing between the upper part of the slot-in reader and the lower part of the motherboard 31.

Air flow deflectors 13 placed to the sides of the body of a cpu heat sink 17, thanks to the depression caused by aspiration of an impeller 14, which is arranged above said heat sink 17, allow a considerable and effective air flow 15, which, going by force through fins of the heat sink 17, cools the cpu and creates a warm air flow directed towards the grids placed on the apex of the pyramid made to eject the ascending warm air flow 16.

Figure 3:
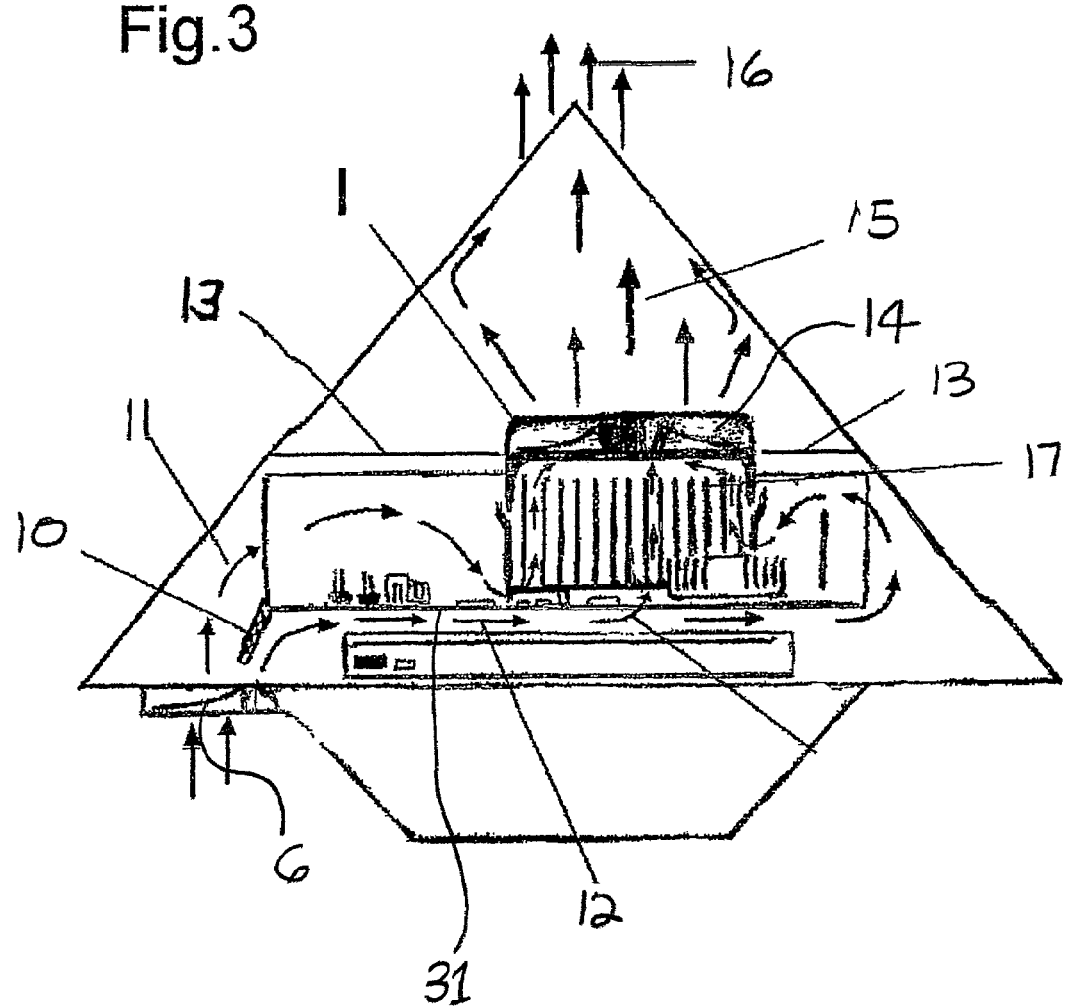
FIG. 3 is a drawing of a vertical section of the case of FIGS. 1A-1B from a front view.

FIG. 3 shows a vertical case section, with front view, which illustrates the air flows. FIG. 3 shows the air intake impeller 6 for the inside of the case, the air flow deflector 10 which divides respectively the air flow which goes to the side of the motherboard 31 and the air flow 12 which goes under the motherboard 31 and in front of the frontal section of the motherboard 31 which allows the fresh air mass crossing between the upper part of the slot-in reader and the lower part of the motherboard.

The air flow deflectors 13 placed to the sides of the body of the heat sink 17 of the cpu, thanks to the depression caused by aspiration of the impeller 14 which is arranged above said heat sink 17 allow a considerable and an effective air flow 15, which, going by force through fins of the heat sink 17, cools the cpu and creates warm air flow directed towards the grids placed on the apex of the pyramid adapted to eject the ascending warm air flow 16.

FIG. 4 shows the chassis 2 in plan view on which the inner components of the computer will be inserted and fixed.

FIG. 4 shows implantation screws 18 of the chassis 2 on the local power source container (FIGS. 1A-1B).

In FIG. 4 the fitting and fixing flaps of the inner components with these common characteristics are shown: the outlined area shows the flap surface which has an inclination of 90° with respect to the plane of the chassis, while the dotted surface of the flap, suitably bent, is parallel to the plane of the chassis. In this way the fitting and fixing flaps work as rails for embracing and fixing the inner components to the chassis 2.

It is shown by 19 the hard disk fitting and fixing flaps.

It is shown by 20 the motherboard fixing flaps.

It is shown by 21 the reader slot-in fitting and fixing flaps.

FIG. 5A and FIG. 5B show the upper part 3 of the case, composed from two structures, 22 and 23. It is shown by 24 the opening for the CD insertion, and by 25 the opening for the motherboard interface. It is shown by 26 the flaps which allow the connection of the structure 22 on the base 1. It is shown by 27 the flaps which allow the connection to the base 1. It is shown by 28 the flaps which allow the connection of the structure 23 to the structure 22 at points 29.

FIG. 5B shows, in perspective view, the two elements of the upper part of the case with the fixing flaps 26 and 27.

It is shown by 30 one of the recesses for the flaps 28. The flaps 26, 27 and 28 can couple points 7, 29 and 30 respectively by means of a magnetic mechanism, for example. Moreover the air flow deflectors 13 are illustrated. As it could be obvious to a skilled man of the art, inner components may be fixed on the chassis and different parts of the case may be coupled to each other in different ways without detracting from the concepts of the present invention.

I claim:

1. A computer comprising:
a motherboard, on which is located a CPU;
electric power means; and
a case for housing at least said motherboard and said CPU;
said computer being characterized by comprising:
an inner impeller housed inside said case to generate an ascending air flow;

a heat sink located beneath said inner impeller, and through which flows the air flow generated by the inner impeller;

an incoming inlet impeller located at a lower inlet opening, which is realized in said case below said motherboard and said CPU;

one or more flow deflectors housed inside said case, and which direct air from said lower inlet opening into said heat sink; and an air outlet opening being formed in said case, over said inner impeller, wherein said heat sink is positioned contacting, to ensure cooling of, said CPU.

2. A computer as claimed in claim 1, comprising further flow deflector housed in said case and arranged to ensure the air flow generated by said inner impeller flows over the motherboard.

3. A computer as claimed in claim 2, wherein said further flow deflector is arranged to ensure the air flow generated by said inner impeller also flows over all heat generating electronic components.

4. A computer as claimed in claim 1, comprising a container housing said electric power means.

* * * * *